US012703666B2

(12) United States Patent
Bouttes et al.

(10) Patent No.: US 12,703,666 B2
(45) Date of Patent: Aug. 11, 2026

(54) MAGNETIC BALL

(71) Applicant: SAINT-GOBAIN CENTRE DE RECHERCHES ET D'ETUDES EUROPEEN, Courbevoie (FR)

(72) Inventors: David Bouttes, Avignon (FR); Emmanuel Nonnet, Saint Saturnin les Avignon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 572 days.

(21) Appl. No.: 18/268,318

(22) PCT Filed: Dec. 17, 2021

(86) PCT No.: PCT/EP2021/086578

§ 371 (c)(1),
(2) Date: Jun. 20, 2023

(87) PCT Pub. No.: WO2022/136176

PCT Pub. Date: Jun. 30, 2022

(65) Prior Publication Data

US 2024/0018052 A1 Jan. 18, 2024

(30) Foreign Application Priority Data

Dec. 22, 2020 (FR) ....................................... 2013905

(51) Int. Cl.
*C04B 35/488* (2006.01)
*B02C 17/20* (2006.01)
*B03C 1/30* (2006.01)
*C04B 35/64* (2006.01)

(52) U.S. Cl.
CPC ............ *C04B 35/488* (2013.01); *B02C 17/20* (2013.01); *B03C 1/30* (2013.01); *C04B 35/64* (2013.01); *C04B 2235/3225* (2013.01); *C04B 2235/3229* (2013.01); *C04B 2235/3246* (2013.01); *C04B 2235/3274* (2013.01); *C04B 2235/528* (2013.01); *C04B 2235/5436* (2013.01); *C04B 2235/5445* (2013.01); *C04B 2235/72* (2013.01); *C04B 2235/763* (2013.01); *C04B 2235/764* (2013.01)

(58) Field of Classification Search
CPC .......... C04B 35/488; C04B 2235/3225; C04B 2235/3229; C04B 2235/3246; C04B 2235/3274
See application file for complete search history.

(56) References Cited

U.S. PATENT DOCUMENTS

| | | | |
|---|---|---|---|
| 5,022,592 A | 6/1991 | Zakheim et al. | |
| 2002/0047058 A1 | 4/2002 | Verhoff et al. | |
| 2009/0120010 A1 | 5/2009 | Recherches | |
| 2022/0186100 A1* | 6/2022 | Liu | C09K 3/1409 |

FOREIGN PATENT DOCUMENTS

| | | |
|---|---|---|
| CN | 110606739 | 12/2019 |

OTHER PUBLICATIONS

International Search Report dated Mar. 23, 2022.

* cited by examiner

*Primary Examiner* — Cameron K Miller
(74) *Attorney, Agent, or Firm* — IPSILON USA, LLP

(57) ABSTRACT

A sintered ball is provided with the following crystallized phases, in mass percentages based on crystallized phases and for a total of 100%: stabilized zirconia: remainder up to 100%; monoclinic zirconia: ≤20%; 4% ≤magnetic component ≤22%; crystallized phases other than stabilized zirconia, monoclinic zirconia and magnetic component: <10%. The magnetic component is chosen from among magnetic spinels, magnetic garnets, magnetic hexagonal ferrites and mixtures thereof. The sintered ball has, in addition to the magnetic component, $CeO_2$ and optionally $Y_2O_3$, in contents that, in molar percentages on the basis of the sum of $ZrO_2$, $CeO_2$ and $Y_2O_3$, 3% $\leq CeO_2 \leq$17.5% and 1.5% $\leq Y_2O_3+(CeO_2)/3.5\leq$5%.

19 Claims, No Drawings

MAGNETIC BALL

RELATED APPLICATION:

This application is a National Phase of PCT/EP2021/086578 filed on Dec. 17, 2021, which claims the benefit of priority from French Patent Application No. 20 13905, filed on Dec. 22, 2020, the entirety of which are incorporated by reference.

FIELD OF THE INVENTION

The invention relates to sintered beads, in particular for grinding foodstuffs.

PRIOR ART

A variety of industries employ beads for finely grinding materials, or "micro-grinding".

Conventionally, all these beads are 0.03 mm to 10 mm in size.

Zirconia beads, at least partially stabilized, are routinely used: they in effect provide a good compromise between wear resistance, density and chemical inertia. During micro-grinding, however, certain of such beads can wear or even break and contaminate the ground material.

Contamination of this type is a particular problem in the agrifood sector.

There is a continuing need for zirconia beads with good wear resistance and which can be used to limit contamination of the ground material.

An aim of the invention is to at least partially overcome this problem.

SUMMARY OF THE INVENTION

In accordance with the invention, this aim is achieved by means of a sintered bead having the following crystalline phases, as percentages by weight on the basis of the crystalline phases and for a total of 100%:

- stabilized zirconia: complement to 100%;
- monoclinic zirconia: ≤20%;
- 4%≤magnetic constituent≤22%;
- crystalline phases other than stabilized zirconia, monoclinic zirconia and magnetic constituent: <10%;

the magnetic constituent being selected from magnetic spinels, magnetic garnets, magnetic hexagonal ferrites and their mixtures;

excluding the magnetic constituent, the sintered bead comprising $CeO_2$ and optionally $Y_2O_3$, in contents such that $1.5\% \leq CeO_2 \leq 17.5\%$ and $1.5\% \leq Y_2O_3 + (CeO_2)/3.5 \leq 5\%$, as molar percentages on the basis of the sum of $ZrO_2$, $CeO_2$ and $Y_2O_3$.

The addition of a magnetic constituent of this type, in the quantities mentioned, means that the fragments resulting from wear can be separated magnetically, while preserving good wear resistance. However, the inventors have discovered that it is necessary for the zirconia to be at least partially stabilized with $CeO_2$, $Y_2O_3$ being optionally present only as a complement to $CeO_2$. In particular, they have shown that the wear resistance is degraded if the stabilized zirconia is entirely stabilized with $Y_2O_3$.

$Y_2O_3$ is the most widely-used stabilizer for zirconia in the envisaged application. The inventors observed its ineffectiveness and took the step of testing other stabilizers for zirconia in order to discover the specific and unexpected effect of $CeO_2$. The inventors believe, without wishing to be bound to this theory, that the presence of a magnetic constituent could cause a destabilization of part of said zirconia stabilized with $Y_2O_3$.

Furthermore, excluding the magnetic constituent, the molar content of $Y_2O_3$ has to be adapted to the molar content of $CeO_2$ and the molar contents of these two oxides must be linked by the relationship $1.5\% \leq Y_2O_3 + (CeO_2)/3.5 \leq 5\%$.

A sintered bead in accordance with the invention may also comprise one or more of the following optional and preferred features:

- excluding the magnetic constituent, $3\% \leq CeO_2$, preferably $5\% \leq CeO_2$, and/or $CeO_2 \leq 16\%$, preferably $CeO_2 \leq 15\%$, as molar percentages on the basis of the sum of $ZrO_2$, $CeO_2$ and $Y_2O_3$;
- excluding the magnetic constituent, $Y_2O_3 + (CeO_2)/3.5$ is more than or equal to 2% and less than or equal to 4%;
- the zirconia is entirely stabilized with $CeO_2$, or in which the stabilized zirconia is entirely stabilized with $CeO_2$ and $Y_2O_3$;
- more than 90% of the stabilized zirconia is present in the form of quadratic zirconia, as a percentage by weight on the basis of the stabilized zirconia;
- the bead has a monoclinic zirconia content, as a percentage by weight on the basis of the total quantity of the crystalline phases, of less than or equal to 10%;
- the bead has a magnetic constituent content of more than or equal to 5% and less than or equal to 18%, as percentages by weight on the basis of the crystalline phases;
- the bead has a magnetic constituent content of more than or equal to 7% and less than or equal to 15%, as percentages by weight on the basis of the crystalline phases;
- excluding oxygen and for more than 90% of its mass, said magnetic spinel is constituted by iron and zinc and copper, by iron and copper and aluminum, by iron and nickel, by iron and cobalt, by iron and copper, by iron and zinc, by iron and magnesium, by iron and manganese, by iron and nickel and zinc, by iron and nickel and zinc and copper, by iron and manganese and zinc, by iron and manganese and zinc and aluminum, by iron and lithium and by zinc and nickel and manganese, by iron and zinc and lithium, by iron and zinc and copper and aluminum and calcium, and their mixtures;
- said magnetic garnet is selected from garnets comprising iron;
- the magnetic hexagonal ferrite is selected from a M-type hexagonal ferrite, a W-type hexagonal ferrite and their mixtures;
- $0.2\% \leq Al_2O_3 \leq 2\%$, $Al_2O_3$ being expressed as excluding the magnetic constituent;
- $CaO \leq 1.5\%$, CaO being expressed as excluding the magnetic constituent;
- the bead has:
  - a size of less than 10 mm and more than 0.01 mm, and
  - a sphericity of more than 0.85.

The invention also concerns powdered sintered beads comprising more than 90%, preferably more than 95%, preferably substantially 100%, as percentages by weight, of sintered beads in accordance with the invention.

The invention also concerns a method for the manufacture of sintered beads in accordance with the invention, said method comprising the following steps in succession:

a) preparing a particulate mixture having a median size of less than 2 μm and a composition that is adapted to obtain sintered beads in accordance with the invention at the end of step g), b) optionally, drying said particulate mixture,
c) preparing a starting charge from said particulate mixture, optionally dried,
d) shaping the starting charge into the form of raw beads,
e) optionally, washing,
f) optionally, drying,
g) sintering at a sintering temperature of more than 1100° C. in order to obtain sintered beads.

The invention also concerns a method for extracting beads and/or fragments of beads in accordance with the invention, said method comprising the following step:

2) applying a magnetic field to said beads and/or said fragments of beads, in a manner such as to attract said beads and/or said fragments of beads.

The magnetic nature of the material of the beads in accordance with the invention advantageously enables the fragments of beads and/or the beads to be extracted from a solid or liquid charge, in particular in order to purify a charge or prepare it for a subsequent step, or to recover bead fragments and/or beads in order to recycle them or reuse them. The method may in particular be carried out in order to purify a charge obtained from a grinding operation, dispersion operation, homogenization operation or an operation for projection onto a surface.

In one embodiment, step 2) is preceded by a step 1) as follows:

1) mixing a material to be ground, to be dispersed, to be homogenized, or to be separated, with beads in accordance with the invention and/or fragments of beads in accordance with the invention then, if a material to be ground, to be dispersed, or to be homogenized has been mixed with said beads and/or said fragments of beads, grinding, dispersing or homogenizing said mixture, respectively, in a manner such as to obtain a charge, the magnetic field being applied to said charge in step 2).

The mixture may advantageously be purified because of the extraction of the beads and/or fragments of beads in accordance with the invention. Step 2) is then a step for purification of the charge by extraction in accordance with the invention, the magnetic field being applied to said charge.

A material is "to be separated" when, after having been mixed with beads and/or fragments of beads in accordance with the invention, it is necessary to separate it from said beads and/or said bead fragments. In particular, the mixture may be an assembly of particles resulting from projecting beads in accordance with the invention onto a surface.

The magnetic nature of the beads may also be used to isolate said beads and/or fragments of said beads of a substrate on the surface of which said beads and/or said fragments of said beads are lying.

In particular, the substrate may be a part onto which the beads in accordance with the invention have been projected or an apparatus used for said projection.

In one embodiment, step 2) is preceded by a step 1') as follows:

1') projecting beads and/or fragments of beads in accordance with the invention onto a surface to be treated, for example a metal surface, by means of a projection apparatus, the magnetic field being applied to said metal surface or to said projection apparatus in step 2).

Thus, step d) is a step for recovery of said beads or said fragments of beads by extraction in accordance with the invention, the magnetic field being applied to said substrate surface, the substrate surface possibly in particular being the surface to be treated and/or a surface of said projection apparatus.

In step 2), the magnetic field. may in particular be applied to a surface of the projection apparatus in contact with the beads during the projection operation. it can therefore be used to recover beads that have not been projected, in particular lodged in locations which are difficult to access.

It may also be applied to the treated surface in order to clean and recover the beads and fragments of beads that are on that surface. The method is particularly effective when the surface includes cavities in which the beads and fragments of beads can become lodged. The invention also concerns the use of powdered sintered beads in. accordance with the invention as a grinding medium, dispersion medium, homogenization medium, or medium for the treatment of surfaces, as well as a device selected from a suspension, a mill, a surface treatment apparatus, a cell lysis apparatus, said device comprising powdered sintered beads in accordance with the invention, in particular manufactured according to a method in accordance with the invention.

DEFINITIONS

The term "particle" means a solid product individualized in a powder.

Conventionally, "powder" and "particulate mixture" are synonyms. For reasons of clarity, in the present description, the term "particulate mixture" will be applied to the powder that is manufactured in step a) of a method for the manufacture of sintered beads in accordance with the invention.

Conventionally, the term "sintering" is used for the consolidation of a raw particle by heat treatment at more than 1100° C. (granular consolidation), optionally with inching, which may be partial or complete, of certain of its constituents (but not of all of its constituents).

The "grains" of a sintered bead are constituted by particles of a particulate mixture agglomerated by the sintering. A sintered bead in accordance with the invention is therefore constituted by an agglomerate of grains bonded by sintering. It may also comprise an amorphous phase.

The term "bead" means a particle with a sphericity, i.e. a ratio between its smallest Feret diameter and its largest Feret diameter, of more than 0.6, irrespective of the manner in which that sphericity is obtained. Preferably, the beads in accordance with the invention have a sphericity of more than 0.7.

The term "size" of a bead is its smallest Feret diameter.

The 10 (denoted $D_{10}$), 50 (denoted $D_{50}$) and 90 (denoted $D_{90}$) "percentiles" of a powder or a particulate mixture are the sizes of particles corresponding to percentages which are respectively equal to 10%, 50% and 90%, by weight, on the cumulative granulometric distribution curve for the sizes of particles of the powder or of the particulate mixture respectively, said particle sizes being classified in increasing order. In accordance with this definition, 10% by weight of the particles of the powder or the particulate mixture therefore have a size of less than $D_{10}$ and 90% of the particles, by weight, have a size more than or equal to $D_{10}$. The percentiles may, for example, be determined with the aid of a laser diffraction granulometer.

The term "median size" of powdered particles or of a particulate mixture is the 50 percentile, $D_{50}$. The median size therefore divides the particles of the powder or the particulate mixture into first and second populations that are equal in mass, these first and second populations comprising only particles with a size which is respectively more than or equal to, or smaller than, the median size.

The term "sintered bead" means a solid bead obtained by sintering a raw bead.

In the context of this application, $HfO_2$ is considered to be incapable of being chemically dissociated from $ZrO_2$. Furthermore, in accordance with the present invention, $HfO_2$ is not intentionally added to the starting charge and is only present in trace amounts, because this oxide is always naturally present in sources of zirconia. In a bead in accordance with the invention, $HfO_2<4\%$. In the chemical composition of a product comprising zirconia, "$ZrO_2$" therefore designates the total content of these two oxides, i.e. "$ZrO_2+HfO_2$".

The magnetic constituent may also comprise a small quantity of zirconium. Unless indicated otherwise, ZrO2 designates the zirconium oxide content (and hafnium oxide content) in the beads. In the present description and in the claims, "zirconia" designates the total content of the zirconia and the hafnia.

The term "stabilized zirconia" means the assembly constituted by quadratic zirconia and cubic zirconia.

The term "powdered compound" means a powder comprising more than 95% by weight of particles comprising more than 90% by weight of said compound. Thus, powdered corundum comprises more than 95% by weight of particles comprising more than 90% by weight of corundum. A "powdered quadratic zirconia" comprises more than 95% by weight of particles comprising more than 90% by weight of quadratic zirconia. A "powdered stabilized zirconia" comprises more than 95% by weight of particles comprising more than 90% by weight of stabilized zirconia.

The term "precursor" of a constituent means one or more ingredients which are capable of providing said constituent during a step for sintering in a manufacturing method in accordance with the invention. As an example, aluminum hydroxides are precursors of alumina.

A quantity of a precursor of an oxide is said to be "equivalent" to a quantity of said oxide when, during sintering, it results in said quantity of said oxide.

The term "spinel" conventionally means the cubic crystallographic structure corresponding to a particular arrangement of elements A and elements B in sites which are conventionally known as "octahedral sites" and "tetrahedral sites". The compounds have a spinel crystallographic structure comprising compounds with formula $AB_2O_4$, known as "normal spinels", in which the elements A occupy a tetrahedral site, and the elements B occupy an octahedral site. In compounds with formulas $B(A,B)O_4$, known as "inverse spinels", the elements B occupy tetrahedral and octahedral sites and the elements A occupy an octahedral site. An example of a magnetic spinel is the inverse spinel $NiFe_2O_4$, where A is nickel disposed on octahedral sites and B is iron disposed on octahedral sites and tetrahedral sites.

The term "garnet" conventionally means a compound with a cubic crystallographic structure corresponding to a particular arrangement of elements C and of elements D with formula $C_3D_5O_{12}$. An example of a magnetic garnet is the garnet $Y_3Fe_5O_{12}$, in which the element C is yttrium and the element D is iron.

The term "hexagonal ferrite" conventionally means a compound with a hexagonal crystallographic structure corresponding to a particular arrangement of elements E and of elements F with formula $EF_{12}O_{19}$, conventionally termed M-type hexagonal ferrite, such as $BaFe_{12}O_{19}$, for example; or with formula $E_3F_{16}O_{27}$, conventionally termed W-type hexagonal ferrite, such as $BaCo_2Fe_{16}O_{27}$, for example; or with formula $E_4F_{28}O_{46}$, conventionally termed X-type hexagonal ferrite, such as $Ba_2Co_2Fe_{28}O_{46}$, for example; or with formula $E_4F_{12}O_{22}$, conventionally termed Y-type hexagonal ferrite, such as $Ba_2Zn_2Fe_{12}O_{22}$, for example; or with formula $E_5F_{24}O_{41}$, conventionally termed Z-type hexagonal ferrite, such as $Ba_3Co_2Fe_{24}O_{41}$, for example; or with formula $E_6F_{36}O_{60}$, conventionally termed U-type hexagonal ferrite, such as $Ba_4Zn_2Fe_{36}O_{60}$, for example. Conventionally, in a hexagonal ferrite, the element iron may be partially or even completely substituted with another element.

A constituent is said to be "magnetic" when it has a bulk magnetization of more than 2 $A \cdot m^2 \cdot kg^{-1}$ measured at a magnetic excitation field equal to 100 kA/m. Thus, a magnetic constituent can be attracted by a magnet.

The magnetic properties of a constituent or of a bead are conventionally measured with the aid of a vibrating sample magnetometer, by subjecting it to a magnetic excitation field of 100 kA/m, at ambient temperature (20° C.).

Certain magnetic constituents, such as hexagonal ferrite, may exhibit hysteresis. The magnetic field is then raised until it exceeds the saturation bulk magnetization, for example beyond 2500 kA/m, then dropped to 100 kA/m in order to carry out the measurement.

Magnetic spinels, magnetic garnets and magnetic hexagonal ferrites are well known. In the event of doubt, a simple measurement of the bulk magnetization as indicated above can check whether a spinel, a garnet or a ferrite is magnetic.

Magnetic spinels, magnetic garnets and magnetic hexagonal ferrites may contain cerium and/or yttrium. This cerium and/or this yttrium are not taken into consideration, however, when "excluding the magnetic constituent" contents are determined. In other words, "excluding the magnetic constituent" means that the $ZrO_2$ and/or $CeO_2$ and/or $Y_2O_3$ contents referred to do not take into account $ZrO_2$ and/or $CeO_2$ and/or $Y_2O_3$ which might be present in the magnetic constituent. Unless indicated otherwise, $CeO_2$ and $Y_2O_3$ are molar percentages excluding the magnetic constituent on the basis of the sum of $ZrO_2$, $CeO_2$ and $Y_2O_3$ excluding the magnetic constituent.

Similarly, contents of $Al_2O_3$ or CaO expressed as "excluding the magnetic constituent" are determined without taking into account the $Al_2O_3$ or the CaO which might be present in the magnetic constituent;

For reasons of clarity, the terms "$ZrO_2$", "$CeO_2$", "$Y_2O_3$", "$Al_2O_3$", "$Fe_2O_3$", "ZnO", "CuO" and "$La_2O_3$" are used to designate the contents of these oxides in the composition, and "zirconia", "ceria", "yttria", "corundum", "iron oxide", " zinc oxide", "copper oxide" and "lanthanum oxide" are used to designate the crystalline phases of these oxides constituted by $ZrO_2$, $CeO_2$, $Y_2O_3$, $Al_2O_3$, $Fe_2O_3$, ZnO, CuO and $La_2O_3$ respectively. However, these oxides may also be present in other phases. In a preferred embodiment, $ZrO_2$, $Y_2O_3$ and $CeO_2$ are present, or even exclusively present in the form of stabilized zirconia. The term "zirconia" conventionally includes the small quantity of hafnia phase, which cannot be distinguished by X-ray diffraction.

A content by weight of a constituent in a product which "excludes oxygen" is the percentage by weight of that constituent on the basis of the mass of the product without taking oxygen into account. As an example, when a product is "constituted by iron, excluding oxygen and for more than 80% of its mass", the iron represents more than 80% of the mass of the product without taking the oxygen present in the product into consideration.

The specific surface area is calculated using the BET (Brunauer Emmet Teller) method as described in the *Journal of American Chemical Society* 60 (1938), pages 309 to 316.

Unless indicated otherwise, all of the means are arithmetic means.

Unless indicated otherwise, all of the percentages are percentages by weight on the basis of the oxides. A content by weight of an element is expressed in the form of the most stable oxide. In particular, each element of the magnetic constituent is converted into the form of the most stable oxide of that element.

"Comprise" or "include" or "have" must be interpreted in a non-limiting manner.

All of the features of the beads can be measured in accordance with the protocols described for the examples.

DETAILED DESCRIPTION

Sintered Bead

A sintered bead in accordance with the invention is preferably constituted by oxides for more than 98%, preferably for more than 99%, preferably for more than 99.5%, preferably for more than 99.9%, of its mass. Preferably, the sintered bead in accordance with the invention is substantially entirely constituted by oxides.

Preferably, in the sintered bead in accordance with the invention, the quantity by weight of the amorphous phase, i.e. glassy phase, as a percentage by weight with respect to the mass of said bead, is less than 7%, preferably less than 5%, preferably substantially zero.

The sintered bead in accordance with the invention is remarkable for the stabilization of the stabilized zirconia: in fact, the zirconia is specifically stabilized with $CeO_2$ and optionally with $Y_2O_3$.

Preferably, in a sintered bead in accordance with the invention, the zirconia is only stabilized by $CeO_2$, and optionally $Y_2O_3$.

Preferably, in the sintered bead in accordance with the invention, excluding the magnetic constituent, the $CeO_2$ content, as molar percentages on the basis of the sum of $ZrO_2$, $CeO_2$ and $Y_2O_3$, is more than or equal to 2%, preferably more than or equal to 3%, preferably more than or equal to 5%, and preferably less than or equal to 16%, preferably less than or equal to 15%.

Preferably, in the sintered bead in accordance with the invention, excluding the magnetic constituent, the $CeO_2$ and $Y_2O_3$ contents, as molar percentages on the basis of the sum of $ZrO_2$, $CeO_2$ and $Y_2O_3$, are such that the sum $Y_2O_3$+$(CeO_2)/3.5$ is more than or equal to 2%, preferably more than or equal to 2.5%, and preferably less than or equal to 4%.

In one embodiment, the stabilized zirconia is entirely stabilized with $CeO_2$ (no $Y_2O_3$ stabilizer) and the $CeO_2$ content, excluding the magnetic constituent, is more than or equal to 2%, preferably more than or equal to 3%, preferably more than or equal to 5%, and less than or equal to 17.5%, preferably less than or equal to 16%, preferably less than or equal to 15%, as molar percentages on the basis of the sum of $ZrO_2$ and $CeO_2$.

In one embodiment, the stabilized zirconia is stabilized with $CeO_2$ and $Y_2O_3$, and the $CeO_2$ and $Y_2O_3$ contents, excluding the magnetic constituent, are such that, as molar percentages on the basis of the sum of $ZrO_2$, $CeO_2$ and $Y_2O_3$:

- $CeO_2$ is more than or equal to 2%, preferably more than or equal to 3%, preferably more than or equal to 5%, and preferably less than or equal to 16%, preferably less than or equal to 15%, and
- $Y_2O_3$+$(CeO_2)/3.5$ is more than or equal to 2%, preferably more than or equal to 2.5%, and less than or equal to 4%.

Preferably, in this embodiment, excluding the magnetic constituent, the $Y_2O_3$ content, as a molar percentage on the basis of the sum of $ZrO_2$, $CeO_2$ and $Y_2O_3$, is more than or equal to 0.5%, preferably more than or equal to 0.8%, and preferably less than or equal to 2%, preferably less than or equal to 1.5%.

Preferably, more than 90%, more than 95%, more than 98%, preferably substantially 100% as a percentage by weight on the basis of the stabilized zirconia, of the stabilized zirconia is present in the form of quadratic zirconia. The limitation to the $CeO_2$ content advantageously enables the quantity of cubic zirconia to be limited.

The sintered bead in accordance with the invention has a monoclinic zirconia content, as a percentage by weight on the basis of the total quantity of the crystalline phases, of less than or equal to 20%, preferably less than or equal to 15%, preferably less than or equal to 10%, preferably less than or equal to 7%, preferably less than or equal to 5%.

The sintered bead in accordance with the invention is also remarkable for the presence of a magnetic constituent, specifically selected from magnetic spinels, magnetic garnets, magnetic hexagonal ferrites and their mixtures.

Preferably, the magnetic constituent has a bulk magnetization of more than 5 $A \cdot m^2 \cdot kg^{-1}$, preferably more than 10 $A \cdot m^2 \cdot kg^{-1}$, preferably more than 15 $A \cdot m^2 \cdot kg^{-1}$, preferably more than 20 $A \cdot m^2 \cdot kg^{-1}$, measured at a magnetic excitation field equal to 100 kA/m.

Preferably, the magnetic constituent is selected from magnetic spinels, magnetic hexagonal ferrites and their mixtures. More preferably, the magnetic constituent is selected from magnetic spinels.

Preferably, said magnetic spinel is selected from spinels comprising iron, preferably from spinels comprising iron, on the one hand, and manganese and/or zinc and/or nickel and/or copper and/or cobalt and/or chromium and/or lithium and/or titanium and/or tin and/or magnesium and/or aluminum and/or cerium and/or calcium, on the other hand, and their mixtures.

Preferably, said magnetic spinel is selected from spinels comprising iron and zinc and copper, iron and copper and aluminum, iron and nickel, iron and cobalt, iron and copper, iron and zinc, iron and magnesium, iron and manganese, iron and nickel and zinc, iron and nickel and zinc and copper, iron and manganese and zinc, iron and manganese and zinc and aluminum, iron and lithium and zinc and nickel and manganese, iron and zinc and lithium, iron and zinc and copper and aluminum and calcium, and their mixtures. Preferably, said magnetic spinel is selected from spinels comprising iron and zinc and copper, iron and manganese and zinc, and their mixtures.

Preferably, said magnetic spinel is selected from spinels constituted, excluding oxygen and for more than 80%, preferably for more than 90%, preferably for more than 95%, preferably for more than 98% of their mass, by iron and zinc and copper, by iron and copper and aluminum, by iron and nickel, by iron and cobalt, by iron and copper, by iron and zinc, by iron and magnesium, by iron and manganese, by iron and nickel and zinc, by iron and nickel and zinc and copper, by iron and manganese and zinc, by iron and manganese and zinc and aluminum, by iron and lithium and zinc and by nickel and manganese, by iron and zinc and lithium, by iron and zinc and copper and aluminum and calcium, and their mixtures.

Preferably, said magnetic spinel is selected from spinels constituted, excluding oxygen and for more than 80%, preferably for more than 90%, preferably for more than 95%, preferably for more than 98% of their mass, by iron and zinc and copper, by iron and manganese and zinc, or by a mixture of these elements.

Preferably, said magnetic garnet is selected from garnets comprising iron, preferably from garnets comprising iron, on the one hand, and yttrium and/or ytterbium and/or erbium and/or dysprosium and/or samarium and/or gadolinium, on the other hand, and their mixtures.

Preferably, said magnetic garnet is selected from garnets comprising iron and yttrium, iron and ytterbium, and their mixtures.

Preferably, said magnetic garnet is selected from garnets constituted, excluding oxygen and for more than 80%, preferably for more than 90%, preferably for more than 95%, preferably for more than 98% of their mass, by iron and yttrium, by iron and ytterbium, and their mixtures.

Preferably, the magnetic hexagonal ferrite is selected from a M-type hexagonal ferrite, a W-type hexagonal ferrite, and their mixtures. Preferably, the magnetic hexagonal ferrite is a M-type hexagonal ferrite.

Preferably said magnetic hexagonal ferrite, preferably M-type, is selected from hexagonal ferrites comprising iron, preferably from hexagonal ferrites comprising iron, on the one hand, and barium and/or strontium and/or lanthanum and/or calcium and/or cerium and/or aluminum and/or cobalt and/or titanium and/or gallium and/or indium and/or manganese and/or zinc and/or nickel and/or copper and/or chromium and/or magnesium, on the other hand, and their mixtures.

Preferably, said hexagonal ferrite, preferably M-type, is selected from hexagonal ferrites comprising iron and barium, iron and strontium, iron and barium and cobalt and titanium, iron and strontium and cobalt and titanium, iron and barium and cobalt, iron and lanthanum and aluminum, iron and barium and aluminum, iron and strontium and aluminum, iron and barium and aluminum and calcium, iron and barium and aluminum and calcium, and their mixtures.

Preferably, said hexagonal ferrite, preferably M-type, is selected from hexagonal ferrites constituted, excluding oxygen and for more than 80%, preferably for more than 90%, preferably for more than 95%, preferably for more than 98% of their mass, by iron and barium, by iron and strontium, by iron and barium and cobalt and titanium, by iron and strontium and cobalt and titanium, by iron and barium and cobalt, by iron and lanthanum and aluminum, by iron and barium and aluminum, by iron and strontium and aluminum, by iron and barium and aluminum and calcium, by iron and barium and aluminum and calcium, and their mixtures.

More preferably, said hexagonal ferrite, preferably M-type, is selected from hexagonal ferrites constituted, excluding oxygen and for more than 80%, preferably for more than 90%, preferably for more than 95%, preferably for more than 98% of their mass, by iron and lanthanum and aluminum, by iron and barium, by iron and strontium, by iron and barium and aluminum, by iron and barium and strontium, and their mixtures.

Preferably, the bead in accordance with the invention has a magnetic constituent content of more than or equal to 5%, preferably more than or equal to 6%, preferably more than or equal to 7%, preferably more than or equal to 8%, and preferably less than or equal to 21%, preferably less than or equal to 20%, preferably less than or equal to 18%, preferably less than or equal to 15%, as percentages by weight on the basis of the crystalline phases and for a total of 100%.

Preferably, the bead in accordance with the invention has a bulk magnetization of more than 1 $A \cdot m^2 \cdot kg^{-1}$, preferably more than 2 $A \cdot m^2 \cdot kg^{-1}$, preferably more than 3 $A \cdot m^2 \cdot kg^{-1}$, preferably more than 4 $A \cdot m^2 \cdot kg^{-1}$, measured at a magnetic excitation field equal to 100 kA/m.

The sintered bead in accordance with the invention preferably has a total content of crystalline phases other than stabilized zirconia, monoclinic zirconia and magnetic constituent, as a percentage by weight on the basis of the total quantity of the crystalline phases, of less than 6%, preferably less than 5%, or even less than 4%.

In a preferred embodiment, the sintered bead in accordance with the invention has the following crystalline phases, as percentages by weight on the basis of the crystalline phases and for a total of 100%:

- stabilized zirconia: complement to 100%;
- monoclinic zirconia: ≤20%, preferably less than or equal to 15%, preferably less than or equal to 10%, preferably less than or equal to 7%, preferably less than or equal to 5%, preferably substantially zero;
- magnetic constituent: content more than or equal to 4%, preferably more than or equal to 5%, preferably more than or equal to 6%, preferably more than or equal to 7%, preferably more than or equal to 8%, and preferably less than or equal to 21%, preferably less than or equal to 20%, preferably less than or equal to 18%, preferably less than or equal to 15%;
- crystalline phases other than stabilized zirconia, monoclinic zirconia, and magnetic constituent: <7%, preferably less than 6%, preferably less than 5%, or even less than 4%; the magnetic constituent being selected from spinels comprising
- iron and zinc and copper,
- iron and copper and aluminum,
- iron and nickel,
- iron and cobalt,
- iron and copper,
- iron and zinc,
- iron and magnesium,
- iron and manganese,
- iron and nickel and zinc,
- iron and nickel and zinc and copper,
- iron and manganese and zinc,
- iron and manganese and zinc and aluminum,
- iron and lithium and zinc and nickel and manganese,
- iron and zinc and lithium,
- iron and zinc and copper and aluminum and calcium,
- and their mixtures, and from hexagonal ferrites, preferably M-type, selected from hexagonal ferrites comprising
- iron and barium,
- iron and strontium,
- iron and barium and cobalt and titanium,
- iron and strontium and cobalt and titanium,
- iron and barium and cobalt,
- iron and lanthanum and aluminum, iron and barium and aluminum,
iron and strontium and aluminum,
iron and barium and aluminum and calcium,
iron and barium and aluminum and calcium,
and their mixtures, and their mixtures, said stabilized zirconia being stabilized with $CeO_2$ and optionally with $Y_2O_3$, the contents of $CeO_2$ and $Y_2O_3$, excluding the magnetic constituent, as molar percentages on the basis of the sum of $ZrO_2$, $CeO_2$ and $Y_2O_3$, being such that:

$CeO_2$ is more than or equal to 2%, preferably more than or equal to 3%, preferably more than or equal to 5%, and preferably less than or equal to 16%, preferably less than or equal to 15%, and $Y_2O_3+(CeO_2)/3.5$ is more than or equal to 2%, preferably more than or equal to 2.5%, and less than or equal to 4%, said sintered bead having a quantity by weight of amorphous phase, as a percentage by weight with respect to the mass of said sintered bead, of less than 7%, preferably less than 5%, preferably substantially zero.

The composition of the sintered bead is principally constituted by $ZrO_2$, $CeO_2$, $Y_2O_3$ and oxides of the elements of the magnetic constituent.

In one embodiment, the sintered bead in accordance with the invention has an $Al_2O_3$ content of more than or equal to 0.2%, preferably more than or equal to 0.25% and, preferably less than 3%, preferably less than or equal to 2.5%, preferably less than or equal to 2%, preferably less than or equal to 1.2%, preferably less than or equal to 1%, preferably less than or equal to 0.8%, preferably less than or equal to 0.5%, as percentages by weight on the basis of the oxides, said $Al_2O_3$ content not taking the aluminum content into account, expressed in the $Al_2O_3$ form, optionally present in the magnetic constituent.

The sintered bead in accordance with the invention preferably has a CaO content of less than 1.5%, preferably less than 1.0%, as percentages by weight on the basis of the oxides, said CaO content not taking the calcium content into account, expressed in the CaO form, optionally present in the magnetic constituent.

In one embodiment, the sintered bead in accordance with the invention has a CaO content of more than 0.1%, preferably more than 0.2%, preferably more than 0.3%, as a percentage by weight on the basis of the oxides, said content CaO not taking the calcium content into account, expressed in the CaO form, optionally present in the magnetic constituent.

Preferably, the sintered bead in accordance with the invention has a surface density of pores, measured using Scanning Electron Microscope images, of less than 5%, preferably less than 4%, preferably less than 2%, preferably less than 1%.

The sintered bead in accordance with the invention preferably has a size of less than 10 mm, preferably less than 8 mm, and/or more than 0.01 mm, preferably more than 0.02 mm, preferably more than 0.03 mm. In one embodiment, the sintered bead in accordance with the invention preferably has a size of less than 8 mm, preferably less than 7 mm and more than 2 mm, preferably more than 3 mm.

A sintered bead in accordance with the invention preferably has a sphericity of more than 0.7, preferably more than 0.8, preferably more than 0.85, or even more than 0.9.

Method for Manufacturing the Sintered Beads

In order to manufacture the sintered beads in accordance with the invention, the following steps a) to g) described above and detailed below may be carried out.

In step a), a particulate mixture having a median size of less than 2 μm is prepared. The composition of the particulate mixture is adapted, in a manner that is known per se, so that the sintered beads have a composition which is in accordance with the invention.

The powders of the starting materials are intimately mixed.

The powders of the starting materials may be ground individually or, as is preferable, co-ground so that the particulate mixture obtained has a median size of less than 2 μm, preferably less than 1.5 μm, preferably less than 1 μm, preferably less than 0.8 μm, preferably less than 0.6 μm, preferably less than 0.5 μm, preferably less than 0.4 μm, preferably less than 0.3 μm and/or preferably more than 0.05 μm. This grinding may be wet grinding. Grinding or co-grinding may also be employed in order to obtain an intimate mixture.

$Y_2O_3$ and $CeO_2$ are known stabilizers for zirconia. In the particulate mixture, they might or might not stabilize the zirconia. In accordance with the invention, the particulate mixture must, however, result in a sintered bead in accordance with the invention.

The ceria and/or a ceria precursor and/or the yttria and/or an yttria precursor may be partially or completely incorporated into the particulate mixture in a form which is separate from the zirconia, in a manner such that after sintering, the zirconia is at least partially stabilized. In this embodiment, the median size of the powdered yttria and/or yttria precursor and/or ceria and/or ceria precursor is preferably less than 1 μm, preferably less than 0.5 μm, more preferably less than 0.3 μm. The efficiency of the stabilization of the zirconia is advantageously improved thereby during sintering.

In one embodiment, the particulate mixture comprises powdered monoclinic zirconia as the sole source of zirconia, and powdered ceria as the sole source of $CeO_2$. The zirconia is only stabilized with $CeO_2$ at the end of step g).

In one embodiment, the particulate mixture comprises powdered ceria as the sole source of $CeO_2$ and powdered zirconia at least partially stabilized with $Y_2O_3$ as the sole source of zirconia. The zirconia only becomes stabilized with $CeO_2$ and $Y_2O_3$ at the end of step g).

Preferably, the powdered zirconia at least partially stabilized with $Y_2O_3$ has a specific surface area, calculated using the BET method, of more than 0.5 $m^2/g$, preferably more than 1 $m^2/g$, preferably more than 1.5 $m^2/g$, and/or less than 20 $m^2/g$, preferably less than 18 $m^2/g$, preferably less than 15 $m^2/g$. Advantageously, the optional grinding, generally in suspension, is facilitated thereby.

In one embodiment, the particulate mixture comprises particles in which the zirconia, stabilized or not, and the ceria and/or the yttria are intimately mixed. Such an intimate mixture may, for example, be obtained by co-precipitation or atomization, and optionally consolidated by a heat treatment. In a particulate mixture of this type, the ceria and/or yttria may be replaced by an equivalent quantity of precursor(s).

Preferably, the particulate mixture does not comprise a precursor of yttria.

Preferably, the particulate mixture does not comprise a precursor of ceria.

Preferably, the particulate mixture does not comprise a precursor of zirconia.

Preferably, when the sintered bead comprises zirconia stabilized with $CeO_2$ and $Y_2O_3$ at the end of step g), the particulate mixture comprises no monoclinic zirconia powder.

In one embodiment, in particular when the magnetic constituent comprises substantially no $ZrO_2$, nor CeO2, nor $Y_2O_3$, and when the sintered bead comprises zirconia stabilized only with $CeO_2$ at the end of step g), the $CeO_2$ content in the particulate mixture is more than or equal to 3%, preferably more than or equal to 5%, preferably more than or equal to 7% and/or less than 17.5%, preferably less than 14%, preferably less than 12%, as molar percentages on the basis of the sum of $ZrO_2$, $Y_2O_3$ and $CeO_2$ present in said particulate mixture.

In one embodiment, in particular when the magnetic constituent comprises substantially no $ZrO_2$, nor $CeO_2$n, or $Y_2O_3$, and when the sintered bead comprises zirconia stabilized with $CeO_2$ and $Y_2O_3$ at the end of step g), the $CeO_2$ content in the particulate mixture is more than or equal to 1.5%, preferably more than or equal to 2%, preferably more than or equal to 3% and/or preferably less than or equal to 17.5%, preferably less than or equal to 16%, preferably less than or equal to 15%, and the $Y_2O_3$ content is such that $Y_2O_3+(CeO_2)/3.5$ is more than or equal to 1.5%, preferably more than or equal to 2%, preferably more than or equal to 2.5%, and preferably less than or equal to 5%, preferably less than or equal to 4%, as molar percentages on the basis of the sum of $ZrO_2$, $Y_2O_3$ and $CeO_2$ present in said particulate mixture.

The particulate mixture also comprises a powder of the magnetic constituent and/or precursor(s) of the magnetic constituent introduced in equivalent quantities. The precursors of the magnetic constituent may be starting materials providing the oxides constituting the magnetic constituent in the sintered bead at the end of step g).

Preferably, the particulate mixture does not comprise any magnetic constituent powder, but powdered precursors of the magnetic constituent each having a median size of less than 5 μm, less than 3 μm, less than 2 μm, less than 1 μm, less than 0.7 μm, preferably less than 0.6 μm, preferably less than 0.5 μm. The person skilled in the art will know how to adjust the quantities of these powders in order to obtain the desired quantity of magnetic constituent in the sintered bead. A portion of the powdered precursors might not combine to form a magnetic constituent.

In one embodiment, the particulate mixture comprises an alumina powder in a quantity more than or equal to 0.2%, preferably more than or equal to 0.25% and preferably less than 3%, preferably less than or equal to 2.5%, preferably less than or equal to 2%, preferably less than or equal to 1.2%, preferably less than or equal to 1%, preferably less than or equal to 0.8%, as percentages by weight on the basis of the mass of the particulate mixture. Advantageously, the aptitude of a particulate mixture to be sintered is improved thereby. Part or all of the alumina may be replaced by an equivalent quantity of alumina precursor. Preferably, the particulate mixture does not comprise an alumina precursor. More preferably, the alumina is substantially exclusively present in the form of corundum. The powdered corundum preferably has a median size of less than 5 μm, preferably less than 3 μm, preferably less than 1 μm.

Preferably, the powders used in the particulate mixture each have a median size of less than 5 μm, preferably less than 3 μm, preferably less than 2 μm, preferably less than 1 μm, preferably less than 0.7 μm, preferably less than 0.6 μm, preferably less than 0.5 μm, preferably less than 0.4 μm, or even less than 0.3 μm.

Whatever the embodiment, one or more powders of the particulate mixture described above may be replaced, at least in part, by equivalent powdered precursors, i.e. by powders which lead in said bead, during the manufacture of a bead in accordance with the invention, to the same constituents (same composition, same crystallographic phase), in the same quantities.

In step b), which is optional, the particulate mixture may be dried, for example oven dried or by atomization, in particular if it has been obtained by wet grinding or if at least one powdered starting material has been obtained by wet grinding. Preferably, the temperature and/or the duration of the drying step are adjusted in a manner such that the residual moisture in the particulate mixture is less than 2%, or even less than 1.5%.

In step c), a starting charge is prepared, preferably at ambient temperature, comprising the particulate mixture obtained at the end of step a) or at the end of step b) and optionally a solvent, preferably water.

As is well known to the person skilled in the art, the starting charge is adapted to the shaping method of step d).

Shaping may in particular result from a gelling process. To this end, a solvent, preferably water, is preferably added to the starting charge in a manner such as to produce a suspension.

The suspension preferably has a dry matter weight content comprised between 50% and 70%.

The suspension may also comprise one or more of the following constituents:
- a dispersant, in an amount of 0 to 10%, as a percentage by weight on the basis of the dry matter;
- a surface tension modifier, in an amount of 0 to 3%, as a percentage by weight on the basis of the dry matter;
- a gelling agent, in an amount of 0 to 2%, as a percentage by weight on the basis of the dry matter.

The dispersants, surface tension modifiers and gelling agents are well known to the person skilled in the art.

The following may be cited by way of examples,
- as dispersants, the sodium or ammonium polymethacrylates family, the sodium or ammonium polyacrylates family, the citrates family, for example ammonium citrate, the sodium phosphates family, and the carbonic acid esters family;
- as surface tension modifiers, organic solvents such as aliphatic alcohols;
- as gelling agents, natural polysaccharides.

The particulate mixture is preferably added to a mixture of water and dispersants/deflocculating agents in a micromill. After agitation, water in which a gelling agent has already been dissolved is added in a manner such as to obtain a suspension.

If the shaping results from an extrusion, thermoplastic polymers or thermosetting polymers may be added to the starting charge, said starting charge preferably not containing solvent.

In step d), any conventional shaping method that is known for the manufacture of sintered beads may be employed.

Of these methods, the following may be cited:
- granulation methods using granulators, fluidized bed granulators, or granulation. disks, for example,
- gelling methods,
- injection or extrusion molding methods, and
- pressing methods.

In a gelling method, droplets of the suspension described above are obtained by passing the suspension through a calibrated orifice. The droplets leaving the orifice fall into a bath of a gelling solution (electrolyte which is suitable for reaction with the gelling agent), where they harden after having attained a substantially spherical shape.

In step e), which is optional, the raw beads obtained during the preceding step are washed, for example with water.

In step f), which is optional, the raw beads, which may have been washed, are dried, for example oven dried.

In step g), the raw beads, optionally washed and/or dried, are sintered. Preferably, sintering is carried out in air, preferably in an electric furnace, preferably at atmospheric pressure.

The sintering of step g) is carried out at a temperature that is preferably more than 1200° C., preferably more than 1250° C., and preferably less than 1600° C., preferably less than 1550° C., preferably less than 1500° C., preferably less than 1450° C., preferably less than 1400° C.

The period during which the temperature is kept constant is preferably more than 1 hour and/or preferably less than 10 hours, preferably less than 7 hours, preferably less than 5 hours, preferably less than 3 hours. Preferably, the sintering period is comprised between 1 and 3 hours.

The sintered beads obtained preferably have a size of more than 0.01 mm and less than 10 mm.

Method for Grinding Dispersion, Homogenization or Separation

The sintered beads in accordance with the invention may be used in a method comprising steps 1) and 2).

In step 1), beads in accordance with the invention are mixed with a material to be ground, dispersed, homogenized or separated, which may be in the form of a powder or a suspension or a mass, for example animal tissue, in particular a DNA extract.

Any known mixing method may be envisaged.

Agitation of the beads, conventionally by rotation of the mixture obtained, may lead to grinding, dispersion or homogenization of the solid portion of the material to be ground, dispersed or homogenized.

The material to be ground, dispersed, homogenized or separated may be an organic material, for example a foodstuff, for example cocoa.

The material to be dispersed or homogenized may be a paint, for example.

The material to be separated may, for example, be powdered non-magnetic particles. Thus, the mixture may, for example, be a particulate mixture resulting from an operation for the treatment of a surface by projection. This mixture may comprise beads and fragments of beads in accordance with the invention projected onto a surface, but also non-magnetic particles projected onto the surface and/or fragments of such magnetic particles, and/or fragments of a coating detached from the surface during projection. The invention therefore enables beads and bead fragments in accordance with the invention to be separated from the mixture.

At the end of step 1), a charge is obtained in which the beads, the bead fragments and the ground, dispersed, homogenized material or the material to be separated have been mixed.

Conventionally, the beads are then extracted from the charge. In accordance with the invention, the fragments of beads, and even the beads, may advantageously be extracted magnetically in step d).

In step 2), a magnetic field is applied to the charge obtained at the end of step 1), and thus to the beads and fragments of beads it contains. This magnetic field exclusively attracts the "magnetic" constituents, enabling them to be extracted.

By regulating the force of the magnetic field, it is possible to adjust the size of the objects (sintered beads and/or fragments of sintered beads) which are extracted: the higher the force of the applied magnetic field, the larger the size of the objects.

This method can advantageously be used to substantially completely separate the sintered beads in accordance with the invention and fragments of said sintered beads in accordance with the invention.

The magnetic field may be applied using any technique which is known to the person skilled in the art, including by using magnets, in particular permanent hard ferrite magnets, permanent AlNiCo alloy magnets, electromagnets, or superconducting coils.

Method for Cleaning a Surface Treated by Projection of Beads in Accordance with the Invention In step 1'), beads in accordance with the invention may be projected by means of a projection apparatus, alone or as a mixture with other media, onto a surface of a part in order to modify its characteristics thereby, for example to modify the appearance or to remove a coating. The surface to be treated may be a metal surface, for example.

After projection, a magnetic field is applied to the projected media in a manner such as to extract fragments of the beads in accordance with the invention and/or beads in accordance with the invention therefrom.

After projection, a magnetic field may also be applied to at least a portion of the surface of the treated part in a manner such as to extract therefrom fragments of beads in accordance with the invention and/or beads in accordance with the invention which might, for example, have remained in a blind hole in the part.

Method for Cleaning an Apparatus for Projecting Beads in Accordance with the Invention Cleaning a projection apparatus necessitates recovering beads remaining in that apparatus, in particular in corners or in cavities in that apparatus. Mechanical cleaning might be difficult.

The application of a magnetic field to a surface of the projection apparatus enables these beads to be recovered very easily.

EXAMPLES

The non-limiting examples below are given with the aim of illustrating the invention.

Measurement Protocols

The following methods were used to determine certain properties of different mixtures of sintered beads. They provided an excellent simulation of the actual behavior in service in the micro-grinding application.

In order to determine the sphericity of a bead, the smallest and largest Feret diameters were measured with a Camsizer XT marketed by Horiba.

In order to determine the "planetary" wear resistance, 20 mL (volume measured using a measuring cylinder) of beads to be tested with a size comprised between 0.9 and 1.2 mm, were weighed (mass $m_0$) and introduced into one of 4 bowls coated with dense sintered alumina, with a capacity of 125 mL, of a PM400 type rapid planetary mill from RETSCH.

2.2 g of silicon carbide from Presi (with a median size $D_{50}$ of 23 μm) and 40 mL, of water were added to the same howl which already contained the beads. The bowl was closed and rotation was begun (planetary motion) at 400 rpm, reversing the direction of rotation every minute for 1 h 30. The contents of the bowl were then washed on a 100 μm sieve in order to remove residual silicon carbide and also debris caused by wear during milling. After screening on a 100 μm sieve, the beads were oven dried at 100° C. for 3 h, then weighed (mass $m_1$). Said beads (mass $m_1$) were then again introduced into one of the bowls with a suspension of SiC (same concentration and quantity as before) and underwent a new milling cycle, which was identical to the preceding cycle. The contents of the bowl were then washed over a 100 μm sieve so as to remove the residual silicon carbide as well as the debris caused by wear during milling. After screening over a 100 μm sieve, the beads were oven dried at 100° C. for 3 h, then weighed (mass $m_2$). Said beads (mass $m_2$) were then re-introduced into one of the bowls with a suspension of SiC (same concentration and quantity as before) and underwent a new milling cycle, which was identical to the preceding cycle. The contents of the bowl were then washed over a 100 μm sieve so as to remove the residual silicon carbide as well as debris caused by wear during milling. After screening over a 100 μm sieve, the beads were oven dried at 100° C. for 3 h then weighed (mass $m_3$).

The planetary wear (PW) was expressed as a percentage (%) and was equal to the loss of mass of the beads with respect to the initial mass of the beads, i.e.: $100\cdot(m_0-m_3)/(m_0)$; the PW result is given in Table 1.

The results were considered to be particularly satisfactory if the products had a planetary wear resistance (PW) which degraded by less than 5% compared to that of Example 1, the reference example. Such a degradation was acceptable because advantageously, the beads can easily be recovered magnetically.

The preferred products have an improved planetary wear resistance (PW) of at least 5% compared with that of Example 1.

The quantification of the crystalline phases present in the sintered beads in accordance with the invention was carried out using samples of polished beads prepared in accordance with the following method: for each of the examples, a monolayer, substantially continuous, of heads with a size comprised between 0.9 and 1.2 mm was partially embedded in acrylic resin at a temperature equal to 180° C. After curing and cooling to ambient temperature, a block of resin was obtained.

The external diameter of the block of resin containing the beads was equal to 25.4 mm.

The block was polished using an abrasive paper with a grain size equal to 65 μm, until substantially the center of the beads could be observed. The block was then polished more finely, the penultimate polishing step being carried out with a DiaPro Nap B diamond preparation marketed by Struers, and the last polishing step being carried out with the aid of a 0.04 μm colloidal silica solution.

The diffraction diagram was acquired with a D8 Endeavor instrument from Bruker, over an angular range 2θ comprised between 5° and 100°, with a step of 0.01°, and a count rate of 0.34 s/step. The front optics comprised a 0.3° primary slit and a 2.5° Soller slit. The polished resin block comprising the beads was rotated about itself at a speed equal to 5 rpm, with an automatic cutter being used. The secondary optics comprised a 2.5° Soller slit, a 0.0125 mm nickel filter and a 1D detector with an opening equal to 4°.

The diffraction diagrams were then analyzed qualitatively with the aid of EVA software and the ICDD2016 database.

Once the phases that were present had been identified, the diffraction diagrams were analyzed quantitatively using High Score Plus software by Rietveld refinement in accordance with the following strategy:

A background signal refinement is carried out with the aid of the "treatment", "determine background" function with the following selections: "bending factor" equal to 0 and "granularity" equal to 40. It should be noted that if a halo induced by the resin is observed, it is possible to manually trace the base line point by point;

Conventionally, ICDD records for the phases present that have been identified and could be quantified are selected and then taken into account in the refinement;

An automatic refinement is then carried out by selecting the background signal which has previously been determined, "use available background", and by selecting the "automatic: option phase fit-default Rietveld" mode;

A manual refinement of the "B overall" parameter for all of the selected phases is then simultaneously carried out.

The quantity of amorphous phase present in the sintered beads of the examples was measured by X-ray diffraction using a D8 Endeavor type instrument from Bruker. The diffraction diagram was acquired using this equipment, in the same manner as for the determination of the crystalline phases present in the beads, with the analyzed sample in the form of a powder. The method applied consisted of adding a known quantity of a completely crystalline standard, in the present case powdered zinc oxide, ZnO, in a quantity equal to 20%, on the basis of the mass of zinc oxide and the sample of ground sintered beads in accordance with the invention. The maximum size of the zinc oxide powder was equal to 1 μm and the beads in accordance with the invention were ground in a manner such as to obtain a powder with a maximum size of less than 40 μm.

After carrying out the Rietveld refinement, the maximum size of the ZnO particles was input into the High Score Plus software in a manner such as to limit micro-absorption effects. The quantity by weight of ZnO particles was also input into the High Score Plus software.

The quantity by weight of each phase present, as a percentage, was taken to be equal to the "as received weight %" value given by the High Score Plus software.

The quantity by weight of amorphous phase, as a percentage on the basis of the mass of the sample, was equal to the complement to 100 of the sum of the quantities by weight of the phases that were present.

Conventionally, if zinc oxide is present among the crystalline phases of the sample to be characterized (which was not the case in the examples below), another oxide not detected as a crystalline phase in the sample to be characterized will be used as the standard.

The surface density of the pores of the sintered beads was measured using the following method. Images of polished surfaces of sections of the sintered beads were produced with the aid of a Scanning Electron Microscope in a manner such that each image was a rectangular image with a length comprised between 40 and 60 μm and a width comprised between 35 μm and 50 μm. 10 images were produced for each example.

For each example, using ImageJ image processing software, the observed surface area, $SO_i$ and the surface area covered by the pores, $SP_i$, were calculated for each of the images i. The total observed surface area, SOT, was equal to the sum of the total observed surface area, $SO_i$, on each of the images i. The total surface area covered by the pores, SPT, is equal to the sum of the surface area covered by the pores, $SP_i$, over each of the images i. The surface density of the pores, expressed as a percentage, is equal to SPT/SOT.

The chemical analysis of the sintered beads was determined by X-ray fluorescence on a disk manufactured by melting said beads.

The bulk density of the sintered beads of the examples, in $g/cm^3$, was measured with the aid of a helium pycnometer (AccuPyc 1330 from Micromeritics®), in accordance with a method based on the measurement of the volume of displaced gas (helium in the present case).

The quantity of beads attracted by a magnet was evaluated using the following method. 100 g of beads from each example, with a size comprised between 0.9 and 1.2 mm, was disposed in a receptacle. A ceramic magnet with a nickel steel jacket with an external diameter of 22 mm, an internal diameter of 16 mm, and a height of 6 mm, with an attractive force of 3 kg, marketed by Wilmart, was then immersed in the beads for 10 seconds. The magnet was then withdrawn and the beads that remained stuck to the magnet were recovered then weighed. This mass M enabled a rapid comparison to be made between the beads of the various examples. A high value for said mass M was sought.

The bulk magnetization of the sintered beads of the examples was determined at ambient temperature with the aid of a vibrating sample magnetometer marketed by Lake Shore Cryotronics, said beads being subjected to a magnetic excitation field equal to 2500 kA/m, said magnetic field being reduced to a value equal to 100 kA/m, this latter value being that at which the measurement of the bulk magnetization was carried out.

Manufacturing Protocol

Sintered beads were prepared from:

- an yttriated powdered zirconia containing a molar content of $Y_2O_3$ equal to 1%, having a specific surface area of the order of 7 $m^2/g$ and a median size equal to 1.1 μm for Examples 3, 8 and 9;
- an yttriated powdered zirconia containing a molar content of $Y_2O_3$ equal to 3%, having a specific surface area of the order of 13 $m^2/g$ and a median size equal to 0.2 μm for Examples 7, 8 and 9;
- a powdered ceria with a purity of more than 99% and having a median size equal to 4.6 μm for Examples 2 to 6, and 8 to 9;
- a powdered alumina with a purity of more than 99.5% and a median size equal to 0.4 μm for Examples 4 to 6, and 8 to 9;
- a non-stabilized CZ-5 powdered zirconia in the monoclinic crystallographic form, marketed by Saint-Gobain ZirPro, having a specific surface area of the order of 6 $m^2/g$ and a median size equal to 4.5 μm for Examples 2, and 4 to 6;
- a powdered zinc oxide having a purity with respect to the weight of ZnO of more than 99% and a median size equal to 0.3 μm for Examples 2 to 5, and 7 to 9;
- a powdered copper oxide having a purity with respect to weight of CuO of more than 96% and a median size equal to 1.3 μm for Examples 2 to 5, and 7 to 9;
- a powdered iron oxide, $Fe_2O_3$, having a purity with respect to weight of $Fe_2O_3$ of more than 97% and a median size equal to 0.34 μm for Examples 2 to 9;
- a powdered lanthanum oxide, $La_2O_3$, having a purity with respect to weight of $La_2O_3$ of more than 99.5% and a median size equal to 7 μm for Example 6.

The powdered sintered beads of Example 1, not in accordance with the invention, was powder of Zirmil-Ce beads marketed by Saint-Gobain Zirpro, with a size comprised between 0.9 and 1.2 mm.

Table 1 summarizes the characteristics of the particulate mixtures of the examples.

These powders were mixed then co-ground in a wet medium until a particulate mixture having a median size of less than 0.4 μm was obtained. The particulate mixture was then dried.

A starting charge consisting of an aqueous suspension comprising, as percentages as a percentage by weight on the basis of the dry matter, 2% of a carboxylic acid type dispersant and 2% of a gelling agent, namely a polysaccharide from the alginate family, was then prepared from this particulate mixture.

A micro-mill was used for this preparation so as to obtain good homogeneity in the starting charge: a solution containing the gelling agent was initially formed. The particulate mixture and the dispersants were added to the water in succession. The solution containing the gelling agent was then added. The mixture obtained in this manner was agitated for 8 hours. The particle size was monitored with the aid of a Partica LA-950 laser diffraction granulometer marketed by Horiba Scientific (median size<0.4 μm), and water was added in a quantity determined so as to obtain an aqueous suspension containing 68% dry matter and with a viscosity, measured with a Brookfield viscometer using a LV3 mobile at a speed equal to 20 rpm, of less than 5000 centipoises. The pH of the suspension was then approximately 9 after adjustment with a strong base.

The suspension was forced through a calibrated hole and at a flow rate which enabled beads with a size of approximately 1 mm to be obtained after sintering. The droplets of suspension fell into a gelling bath based on an electrolyte (divalent cation salt), reacting with the gelling agent. The raw beads were collected, washed, then dried at 80° C. to eliminate the moisture. The beads were then transferred to a sintering furnace where they were heated at a rate of 100° C./h to a temperature equal to 1250° C. for Examples 2 and 4 to 9 and to 1275° C. for Example 3. At the end of a 4 hour constant temperature stage at this temperature, the temperature dropped by natural cooling.

Results

The results obtained are summarized in Tables 2 to 4 below.

TABLE 1

| | Examples | | | | | | | | |
|---|---|---|---|---|---|---|---|---|---|
| | 1(*) | 2 | 3 | 4 | 5(*) | 6 | 7(*) | 8(*) | 9 |
| Composition of particulate mixture (percentages by weight) | | | | | | | | | |
| Powdered yttriated zirconia containing a molar content of $Y_2O_3$ equal to 1% | — | — | 81.87 | — | — | — | — | 11.62 | 36.24 |
| Powdered ceria | — | 14.78 | 9.10 | 13.08 | 11.86 | 14.80 | — | 1.27 | 6.64 |
| Non-stabilized CZ-5 powdered zirconia | — | 75.16 | — | 66.56 | 60.79 | 75.20 | — | — | |

TABLE 1-continued

| | Examples | | | | | | | | |
|---|---|---|---|---|---|---|---|---|---|
| | 1(*) | 2 | 3 | 4 | 5(*) | 6 | 7(*) | 8(*) | 9 |
| Powdered yttriated zirconia containing a molar content of $Y_2O_3$ equal to 3% | — | — | — | — | — | — | 90.00 | 76.86 | 46.80 |
| Powdered alumina | — | — | — | 0.33 | 0.30 | 0.71 | — | 0.30 | 0.30 |
| Powdered zinc oxide | — | 1.71 | 1.53 | 3.40 | 4.59 | — | 1.69 | 1.69 | 1.70 |
| Powdered copper oxide | — | 1.67 | 1.50 | 3.32 | 4.48 | — | 1.66 | 1.65 | 1.66 |
| Powdered iron oxide | — | 6.68 | 6.00 | 13.31 | 17.98 | 7.78 | 6.65 | 6.61 | 6.66 |
| Powdered lanthanum oxide | — | — | — | — | — | 1.51 | — | — | — |

(*): not in accordance with the invention

TABLE 2

| | Examples | | | | | | | | |
|---|---|---|---|---|---|---|---|---|---|
| | 1(*) | 2 | 3 | 4 | 5(*) | 6 | 7(*) | 8(*) | 9 |
| Chemical analysis, as percentages by weight on the basis of the oxides, unless otherwise indicated | | | | | | | | | |
| $ZrO_2$ (%) | 82 | 74.7 | 79.7 | 68.1 | 59.4 | 75.4 | 83.8 | 83.8 | 79.1 |
| $CeO_2$ (%) | 16 | 14.8 | 9.6 | 12.7 | 11 | 14.2 | — | 1.3 | 6.5 |
| $Y_2O_3$ (%) | — | — | 1.7 | — | — | — | 5.0 | 4.6 | 3.2 |
| ZnO (%) | — | 1.2 | 1.2 | 2.3 | 5.1 | — | 1.8 | 1.2 | 1.7 |
| CuO (%) | — | 1.4 | 1.1 | 3 | 4.4 | — | 1.6 | 1.5 | 1.4 |
| $Fe_2O_3$ (%) | — | 6.3 | 6.1 | 13 | 19.2 | 7.3 | 5.5 | 6.3 | 6.8 |
| $La_2O_3$ (%) | — | — | — | — | — | 1.2 | — | — | |
| $Al_2O_3$ (%) | 0.5 | 0.4 | — | 0.3 | 0.4 | 1.2 | 0.5 | 0.6 | 0.6 |
| CaO (%) | 0.3 | 0.7 | 0.3 | 0.3 | 0.3 | 0.3 | 0.4 | 0.1 | 0.3 |
| Oxides other than $ZrO_2$, $CeO_2$, $Y_2O_3$, ZnO, CuO, $Fe_2O_3$, $La_2O_3$, $Al_2O_3$, and CaO (%) | 1.2 | 0.5 | 0.3 | 0.3 | 0.2 | 0.4 | 0.4 | 0.6 | 0.4 |
| $CeO_2$ as molar % on the basis of the sum of $ZrO_2$, $HfO_2$, $CeO_2$ and $Y_2O_3$ | 12.2 | 12.4 | 7.8 | 11.8 | 11.7 | 11.9 | 0 | 1.1 | 5.4 |
| $Y_2O_3$ as molar % on the basis of the sum of $ZrO_2$, $HfO_2$, $CeO_2$ and $Y_2O_3$ | 0 | 0 | 1.1 | 0 | 0 | 0 | 3.1 | 2.9 | 2 |
| $Y_2O_3 + CeO_2/3.5$, as molar % | 3.5 | 3.5 | 3.3 | 3.4 | 3.3 | 3.4 | 3.1 | 3.2 | 3.5 |

(*): not in accordance with the invention

TABLE 3

| | Examples | | | | | | | | |
|---|---|---|---|---|---|---|---|---|---|
| | 1(*) | 2 | 3 | 4 | 5(*) | 6 | 7(*) | 8(*) | 9 |
| Crystalline phases, as a percentage by weight on the basis of the mass of the crystalline phases | | | | | | | | | |
| Zirconia stabilized with $CeO_2$ and optionally $Y_2O_3$ | 95 | 87 | 89 | 79 | 68 | 92 | 46 | 48 | 86 |
| Monoclinic zirconia | 5 | 5 | 5 | 5 | 7 | Complement to 100 | 46 | 42 | 6 |
| Magnetic spinel | — | 8 | 6 | 16 | 25 | — | 8 | 10 | 8 |
| Nature of said spinel | — | Spinel comprising iron and zinc and copper | Spinel comprising iron and zinc and copper | Spinel comprising iron and zinc and copper | Spinel comprising iron and zinc and copper | — | Spinel comprising iron and zinc and copper | Spinel comprising iron and zinc and copper | Spinel comprising iron and zinc and copper |

TABLE 3-continued

| | Examples | | | | | | | | |
|---|---|---|---|---|---|---|---|---|---|
| | 1(*) | 2 | 3 | 4 | 5(*) | 6 | 7(*) | 8(*) | 9 |
| M-type magnetic hexagonal ferrite | — | — | — | — | — | 6 | — | — | — |
| Nature of said hexagonal ferrite | — | — | — | — | — | M-type hexagonal ferrite comprising iron and lanthanum and aluminum | — | — | — |

(*): not in accordance with the invention

TABLE 4

| | Examples | | | | | | | | |
|---|---|---|---|---|---|---|---|---|---|
| | 1(*) | 2 | 3 | 4 | 5(*) | 6 | 7(*) | 8(*) | 9 |
| Characteristics | | | | | | | | | |
| Bulk density of beads (g/cm$^3$) | 6.20 | 6.10 | 6.05 | 6.00 | 5.93 | 6.00 | 5.79 | 5.81 | 6.01 |
| Planetary wear, PW (as %) | 2.3 | 2 | 1.9 | 2.1 | 3 | 1.8 | 3.3 | 2.5 | 1.6 |
| Improvement in PW %/ Example 1 | — | 13% | 17.4% | 8.7% | −30% | 21.7% | −43.5% | −8.7% | 30.4% |
| Mass M of beads attracted by a magnet (in g) | 0 | 10 | 9.1 | 13.6 | 15.5 | 1.3 | 8.2 | 9.3 | 9.2 |
| Bulk magnetization ($A \cdot m^2 \cdot kg^{-1}$) | n.d. | 4.5 | n.d. | n.d. | 13 | 1.7 | n.d. | n.d. | n.d. |

(*): not in accordance with the invention
n.d.: not determined

The powdered beads of the examples had a mean sphericity of more than 0.9.

The beads of Examples 2 to 9 had a substantially zero quantity of amorphous phase as well as a surface density of the pores of less than 1%.

Before quantifying the crystalline phases by X-ray diffraction, electron microprobe spot samples revealed the presence of a phase comprising iron and copper and zinc in the beads of Examples 2 to 5 and 7 to 9, and a phase comprising iron and lanthanum and aluminum in the beads of Example 6.

A comparison of reference Example 1, not in accordance with the invention, and Example 2, in accordance with the invention, showed that the beads of Example 2, comprising zirconia stabilized with $CeO_2$, a molar $CeO_2$ content equal to 12.4% and with a content of spinel comprising iron and zinc and copper equal to 8% on the basis of the mass of the crystalline phases, were attracted by a magnet, in contrast to the beads of reference Example 1 the powdered beads of Example 2 had a wear PW % equal to 2%, i.e. 13% lower than the wear PW % of the powdered beads of reference Example 1, not in accordance with the invention.

A comparison of reference Example 1, not in accordance with the invention, and Example 3 in accordance with the invention, showed that the beads of Example 3, comprising zirconia stabilized with $CeO_2$ and $Y_2O_3$, molar contents of $CeO_2$ and $Y_2O_3$ being equal to 7.8% and 1.1%, respectively, and with a content of spinel comprising iron and zinc and copper equal to 6% on the basis of the mass of the crystalline phases. are attracted by a magnet, in contrast to the beads of reference Example 1; the powdered beads of Example 3 had a wear PW % equal to 1.9%, i.e. 17.4% lower than the wear PW % of the powdered beads of reference Example 1. not in accordance with the invention.

A comparison of reference Example 1, not in accordance with the invention, and Example 4, in accordance with the invention, showed that the beads of Example 4, comprising zirconia stabilized with $CeO_2$, a molar content of $CeO_2$ equal to 11.8%, and with a content of spinel comprising iron, zinc and copper equal to 16% on the basis of the mass of the crystalline phases, are attracted by a magnet, in contrast to the beads of reference Example 1; the powdered beads of Example 4 had a wear PW % equal to 2.1%, i.e. 8.7% lower than the wear PW % of the powdered beads of reference Example 1, not in accordance with the invention.

A comparison of reference Example 1, not in accordance with the invention, and Example 5, in accordance with the invention, showed that the beads of said. Example 5, comprising zirconia stabilized with $CeO_2$, a molar content of $CeO_2$ equal to 11.7%, and with a content of spinel comprising iron, zinc and copper equal to 25% on the basis of the mass of the crystalline phases, are attracted by a magnet, in contrast to the beads of reference Example 1; furthermore, the powdered beads of Example 5 had a wear PW % equal to 3%, i.e. 30% higher than the wear PW % of the powdered beads of reference Example 1, not in accordance with the invention.

A comparison of reference Example 1, not in accordance with the invention, and Example 6, in accordance with the invention, showed that the beads of Example 6, comprising zirconia stabilized with $CeO_2$, a molar content of $CeO_2$ equal to 11.9%, and with a content of M-type hexagonal ferrite comprising iron, lanthanum and aluminum equal to 6% on the basis of the mass of the crystalline phases, are attracted by a magnet, in contrast to the beads of reference Example 1; the powdered beads of Example 6 had a wear PW % equal to 1.8%, i.e. 21.7% lower than the wear PW % of the powdered beads of reference Example 1, not in accordance with the invention.

A comparison of reference Example 1, not in accordance with the invention, Example 2, in accordance with the invention, and Example 7, not in accordance with the invention, showed that the beads of Example 7, comprising zirconia stabilized with $Y_2O_3$, a molar content of $Y_2O_3$ equal to 3.1%, and with a content of spinel comprising iron, zinc and copper equal to 8% on the basis of the mass of the crystalline phases, surprisingly had a wear PW % equal to 3.3%, i.e. 43.5% higher than the wear PW % of the beads of Example 1 and 65% higher than the wear PW % of the beads of Example 2. Although the beads of Example 7 were attracted by a magnet, they had a much higher wear PW % than that of reference Example 1, demonstrating that the presence of $CeO_2$ is necessary as a stabilizer for the zirconia.

A comparison of reference Example 1, not in accordance with the invention, Example 3, in accordance with the invention, and Example 8, not in accordance with the invention, showed that the beads of Example 8, comprising zirconia stabilized with $CeO_2$ and $Y_2O_3$, molar contents of $CeO_2$ and $Y_2O_3$ equal to 1.1% and 2.9% respectively, and with a content of spinel comprising iron, zinc and copper equal to 10% on the basis of the mass of the crystalline phases, had a wear PW % equal to 2.5%, i.e. 8.7% higher than the wear PW % of the beads of Example 1 and 31.6% higher than the wear PW % of the beads of Example 3. Although the beads of Example 8 were attracted by a magnet, they had a higher wear PW % than that of Examples 1 and 3, demonstrating that the presence of $CeO_2$ in a quantity of more than 1.5 mol % is necessary.

A comparison of reference Example 1, not in accordance with the invention, and Example 9, in accordance with the invention, showed that the beads of Example 9, comprising zirconia stabilized with $CeO_2$ and $Y_2O_3$, the molar contents of $CeO_2$ and $Y_2O_3$ being equal to 5.4% and 2%, respectively, and with a content of spinel comprising iron and zinc and copper equal to 8% on the basis of the mass of the crystalline phases, were attracted by a magnet, in contrast to the beads of reference Example 1; the powdered beads of Example 9 had a wear PW % equal to 1.6%, i.e. lower than the wear PW % of the powdered beads of reference Example 1, not in accordance with the invention.

The sintered beads in accordance with the invention as well as fragments of said beads can therefore be separated readily from a liquid or ground solid constituent with the aid of said beads, simply by applying a magnetic field.

As is abundantly clear here, therefore, the invention can be used to provide powdered zirconia beads with good wear resistance and which can be used to limit contamination of the ground material.

Clearly, the invention is not limited to the examples and embodiments described above.

The invention claimed is:

1. A sintered bead comprising the following crystalline phases, as percentages by weight on the basis of the crystalline phases and for a total of 100%:

stabilized zirconia: complement to 100%;

monoclinic zirconia: ≤20%;

4% ≤magnetic constituent ≤22%;

crystalline phases other than stabilized zirconia, monoclinic zirconia and magnetic constituent: <10%;

the magnetic constituent being selected from magnetic spinels, magnetic garnets, magnetic hexagonal ferrites and their mixtures;

excluding the magnetic constituent, the sintered bead comprising $CeO_2$ and optionally $Y_2O_3$ in contents such that 3% $\leq CeO_2 \leq$17.5% and 1.5% $\leq Y_2O_3+(CeO_2)/3.5 \leq$5%, as molar percentages on the basis of the sum of $ZrO_2$, $CeO_2$ and $Y_2O_3$.

2. The sintered bead as claimed in claim 1 in which, excluding the magnetic constituent, $CeO_2 \leq$16%, as molar percentages on the basis of the sum of $ZrO_2$, $CeO_2$ and $Y_2O_3$.

3. The sintered bead as claimed in claim 2, in which 5% $\leq CeO_2$ and $CeO_2 \leq$15%, as molar percentages on the basis of the sum of $ZrO_2$, $CeO_2$ and $Y_2O_3$.

4. The sintered bead as claimed in claim 1 in which, excluding the magnetic constituent, $Y_2O_3+(CeO_2)/3.5$ is more than or equal to 2% and less than or equal to 4%.

5. The sintered bead as claimed in claim 1, in which the zirconia is entirely stabilized with $CeO_2$, or in which the stabilized zirconia is entirely stabilized with $CeO_2$ and $Y_2O_3$.

6. The sintered bead as claimed in claim 1, in which more than 90% of the stabilized zirconia is present in the form of quadratic zirconia, as a percentage by weight on the basis of the stabilized zirconia.

7. The sintered bead as claimed in claim 1, having a monoclinic zirconia content, as a percentage by weight on the basis of the total quantity of the crystalline phases, of less than or equal to 10%.

8. The sintered bead as claimed in claim 1, wherein the magnetic constituent content is more than or equal to 5% and less than or equal to 18%, as percentages by weight on the basis of the crystalline phases.

9. The sintered bead as claimed in claim 1, wherein the magnetic constituent content is more than or equal to 7% and less than or equal to 15%, as percentages by weight on the basis of the crystalline phases.

10. The sintered bead as claimed in claim 1, in which the magnetic constituent is selected from magnetic spinels, magnetic hexagonal ferrites and their mixtures.

11. The sintered bead as claimed in claim 1, in which excluding oxygen and for more than 90% of its mass, said magnetic spinel is constituted by iron and zinc and copper, by iron and copper and aluminum, by iron and nickel, by iron and cobalt, by iron and copper, by iron and zinc, by iron and magnesium, by iron and manganese, by iron and nickel and zinc, by iron and nickel and zinc and copper, by iron and manganese and zinc, by iron and manganese and zinc and aluminum, by iron and lithium and zinc and by nickel and manganese, by iron and zinc and lithium, by iron and zinc and copper and aluminum and calcium, and their mixtures; and/or the magnetic hexagonal ferrite is selected from a M-type hexagonal ferrite, a W-type hexagonal ferrite and their mixtures, and/or if the magnetic constituent is not selected from magnetic spinels, magnetic hexagonal ferrites and their mixtures, said magnetic garnet is selected from garnets comprising iron.

12. The sintered bead as claimed in claim 1, in which 0.2% $\leq Al_2O_3 \leq$2%, $Al_2O_3$ being expressed as excluding the magnetic constituent; and/or $CaO \leq$1.5%, CaO being expressed as excluding the magnetic constituent.

13. The sintered bead as claimed in claim 1, having a size of less than 10 mm and more than 0.01 mm, and a sphericity of more than 0.85.

14. Powdered sintered beads comprising more than 90%, as percentages by weight, of sintered beads in accordance with claim 1.

15. A method for extracting beads and/or fragments of beads in accordance with claim 1, said method comprising the following step:

1). applying a magnetic field to said beads and/or said fragments of beads, in a manner such as to attract said beads or said fragments of beads.

16. A method for grinding, dispersing, homogenizing a material, said method comprising the following steps:

1) mixing a material to be ground, to be dispersed, to be homogenized, with beads and/or fragments of beads in accordance with claim 1, in order to obtain a charge;
2) purifying the charge by applying a magnetic field to said beads and/or said fragments of beads, in a manner such as to attract said beads or said fragments of beads, the magnetic field being applied to said charge.

17. A method for extracting beads or fragments of beads in accordance with claim 1 from a surface of a substrate on which said beads or said fragments of beads are lying, said method comprising the following steps:

1) projecting said beads and/or fragments of beads onto a surface to be treated by means of a projection apparatus;
2) recovering said beads or said fragments of beads by applying a magnetic field to said beads and/or said fragments of beads, in a manner such as to attract said beads or said fragments of beads, the magnetic field being applied to said substrate surface.

18. The powdered sintered beads in accordance with claim 14, wherein said powdered sintered beads are configured as any one of a grinding medium, a dispersion medium, a homogenizing medium or a medium for the treatment of surfaces.

19. A method according to claim 17, wherein the substrate surface is the surface to be treated and/or a surface of said projection apparatus.

* * * * *